United States Patent [19]

Schafer et al.

[11] 4,055,393

[45] Oct. 25, 1977

[54] PROPYLENE OXIDE REACTION PRODUCTS, PROCESS FOR THEIR MANUFACTURE AND THEIR USE

[75] Inventors: Paul Schafer, Riehen; Heinz Abel, Reinach, both of Switzerland; Fritz Mayer, Weil am Rhine, Germany

[73] Assignee: Ciba-Geigy Corporation, Ardsley, N.Y.

[21] Appl. No.: 671,874

[22] Filed: Mar. 29, 1976

[30] Foreign Application Priority Data

Apr. 4, 1975 Switzerland .......................... 4293/75

[51] Int. Cl.$^2$ .................. C09B 67/00; C09F 5/08; D06P 1/613
[52] U.S. Cl. ........................................ 8/62; 260/410.6; 8/1 E; 8/21 C; 8/26 HA; 8/39 C; 8/169; 8/174; 560/76; 560/190
[58] Field of Search ................. 260/410.6; 8/62, 93, 8/169

[56] References Cited

U.S. PATENT DOCUMENTS

| | | | |
|---|---|---|---|
| 1,922,459 | 8/1933 | Schmidt et al. | 260/410.6 X |
| 2,089,569 | 8/1937 | Orthner et al. | 260/410.6 |
| 2,450,079 | 9/1948 | Brown | 260/410.6 |
| 2,705,724 | 5/1955 | Cottle et al. | 260/410.6 X |
| 2,800,500 | 7/1957 | Matuszak et al. | 260/410.6 X |
| 3,124,602 | 3/1964 | Alscher et al. | 260/410.6 |
| 3,398,201 | 8/1968 | Glickman | 260/410.6 X |
| 3,859,318 | 1/1975 | Lesuer | 260/410.6 |
| 3,957,855 | 5/1976 | Miller | 260/410.6 X |

*Primary Examiner*—Patrick P. Garvin
*Assistant Examiner*—John F. Niebling
*Attorney, Agent, or Firm*—Karl F. Jorda; Edward McC. Roberts; Prabodh I. Almaula

[57] ABSTRACT

Propylene oxide reaction products, and the salts or quaternization products thereof are provided which are obtained from
  a. an at least trihydric aliphatic alcohol of 3 to 10 carbon atoms,
  b. 1,2-propylene oxide,
  c. an aliphatic dicarboxylic acid of 2 to 10 carbon atoms, an aromatic dicarboxylic acid of 8 to 12 carbon atoms or the anhydrides thereof, and at least one of the following components:
  d. an aliphatic diol with a molecular weight of at most 2000,
  e. a fatty alcohol containing 12 to 22 carbon atoms,
  f. a fatty acid containing 12 to 22 carbon atoms, and
  g. an aliphatic monoamine or diamine containing 2 to 12 carbon atoms, of which component (g) is used only at the conclusion and only if component (c) is ethylenically unsaturated.

The inventive products are suitable for widely varying uses in textile finishing. In particular they are used as printing and dyeing assistants, for example, to improve the fastness properties of dyeings, to prevent the bleeding of non-dyed or non-printed areas during the washing-off process of these dyeings or prints, or to prevent the deposition of oligomers on the textile material during the high temperature dyeing of polyester fibers.

33 Claims, No Drawings

PROPYLENE OXIDE REACTION PRODUCTS, PROCESS FOR THEIR MANUFACTURE AND THEIR USE

The present invention provides propylene oxide reaction products, and the salts or quaternisation products thereof obtained from a. an at least trihydric aliphatic alcohol of 3 to 10 carbon atoms,
b. 1,2-propylene oxide,
c. an aliphatic dicarboxylic acid of 2 to 10 carbon atoms, an aromatic dicarboxylic acid of 8 to 12 carbon atoms or the anhydrides thereof, and at least one of the following components:

d. an aliphatic diol with a molecular weight of at most 2000,
e. a fatty alcohol containing 12 to 22 carbon atoms,
f. a fatty acid containing 12 to 22 carbon atoms, and
g. an aliphatic monoamine or diamine containing 2 to 12 carbon atoms, of which component (g) is used only at the conclusion and only if component (c) is ethylenically unsaturated.

Apart from the three obligatory components (a), (b) and (c), the propylene oxide reaction products are always synthesised from at least one other additional component, namely (d), (e), (f) or (g). Any carboxyl group still present can be in acid or salt form and the amino groups which may be present can be in quaternised form or in the form of acid salts.

Preferred propylene oxide reaction products are synthesised, for example, from the following components:

(a) + (b) + (c) + (d)

(a) + (b) + (c) + (d) + (e)

(a) + (b) + (c) + (d) + (f)

(a) + (b) + (c) + (f)

(a) + (b) + (c) + (e) + (g)

(a) + (b) + (c) + (d) + (e) + (g)

(a) + (b) + (c) + (d) + (f) + (g)

Preferably the propylene oxide reaction products are synthesised from components of the following composition:

Component (a)

Especially preferred in this connection are trihydric to hexahydric alkanols of 3 to 6 carbon atoms. These alkanols can be branched or unbranched. Glycerol, pentaerythritol, sorbitol or trimethylolpropane may be cited as examples.

Component (b)

As defined herein, only 1,2-propylene oxide is possible.

Component (c)

Particularly suitable as component (c) are aliphatic saturated dicarboxylic acids containing 2 to 10, in particular 4 to 10, carbon atoms, or the anhydrides thereof, or ethylenically unsaturated dicarboxylic acids containing 4 to 10 carbon atoms or anhydrides thereof, or aromatic dicarboxylic acids containing 8 to 12 carbon atoms, or anhydrides thereof.

Examples of possible aliphatic saturated dicarboxylic acids are: oxalic, malonic, succinic, glutaric, adipic, pimelic, suberic, azelaic or sebacic acid or the anhydrides thereof, in particular succinic or glutaric anhydride.

Ethylenically unsaturated dicarboxylic acids can be preferably fumaric, maleic or itaconic acid, also mesaconic, citraconic or methylenemalonic acid or octenoic or decenoic acid.

Of the anhydrides of these acids, maleic anhydride is preferred.

The aromatic dicarboxylic acids are preferably monocyclic or bicyclic aromatic dicarboxylic acids containing 8 to 12 carbon atoms, for example phthalic acid (1,2), isophthalic acid (1,3) or terephthalic acid (1,4) or naphthalenedicarboxylic acid. As anhydrides, particular mention may be made of phthalic anhydride, phthalic anhydride which is unsubstituted or substituted by methyl, or naphthalenedicarboxylic anhydride.

Component (d)

Diols of formula $$HO-(CH_2CH_2O)_n H, \tag{1}$$

wherein $n$ is an integer from 1 to 40, are preferably used. Examples of such diols are ethylene glycol, diethylene glycol or polyethylene glycols with an average molecular weight of 200 to 1500.

Component (e)

Examples of fatty alcohols are lauryl, myristyl, cetyl, stearyl, arachyl or behenyl alcohol. Alkanols containing 16 to 20 carbon atoms are preferably used and stearyl alcohol in particular has proved very suitable.

Component (f)

The fatty acids are saturated or unsaturated acids, for example lauric, myristic, palmitic, stearic, arachinic or behenic acid and dodecenoic, tetradecenoic, hexadecenoic, oleic, linoleic, linolenic, rincinolic, eicosenoic or docosenoic acid.

Saturated fatty acids containing 16 to 20 carbon atoms, for example palmitic or arachinic acid or, in particular, stearic acid, are especially preferred.

Component (g)

These amines, which combine additively with the ethylenically unsaturated bond of component (c) which may be present, can be, for example, ethylamine, propylamine, butylamine, hexylamine, octylamine, decylamine or dodecylamine, or preferably aliphatic diamines containing only one primary amino group and 2 to 18, in particular 2 to 8, carbon atoms. Suitable diamines are, for example, ethylenediamine, dimethylaminoethylamine, 1-amino-3-diethylamino-2-propanol, or, in particular, those of formula

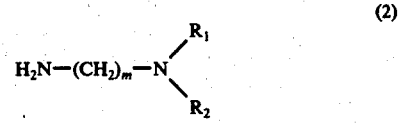

$$H_2N-(CH_2)_m-N\begin{matrix} R_1 \\ R_2 \end{matrix} \tag{2}$$

wherein each of $R_1$ and $R_2$ represents alkyl of 1 to 3 carbon atoms and $m$ is 2 or 3. 3-Dimethylamino-1-propylamine is particularly preferred. The amino groups deriving from component (g) can be in the form of acid salts or quaternised. The usual inorganic and organic acids which can be used for such purposes are suitable for the salt formation, for example hydrochloric acid, sulphuric acid, phosphoric acid, nitric acid, formic acid, acetic acid, or propionic acid. Hydrochloric or acetic acid is preferably used.

In the case of quaternised products, the tertiary amino groups of the amine adducts are quaternised with conventional quaternising agents, for example with alkyl halides, such as methyl or ethyl bromide or chloride; substituted alkyl halides, for example aralkyl halides, such as benzyl chloride; diaklyl sulphates, for example dimethyl or diethyl sulphate; halocarboxylic acid esters, for example esters of chloroacetic acid with polyethylene glycols which are etherified in the terminal position with alkanols; halocarboxylic acid amides, for example chloroacetamide; epihalohydrins, for example epichlorohydrin.

Alkyl or aralkyl halides containing 1 to 7 carbon atoms, for example methyl chloride or benzyl chloride, have proved particularly suitable.

Propylene oxide reaction products with acid groups can contain these in the free form or in the salt form. The conversion into the salts is effected in the customary manner by addition of bases, such as ammonia or alkali hydroxides, for example sodium or potassium hydroxide.

As a rule the propylene oxide reaction products can be obtained from 1 to 2 moles of component (a), 4 to 120 moles of component (b), 1 to 7 moles, in particular 2 to 7 moles, of component (c), and, where also used, 1 to 4 moles of component (d), 1 to 4 moles of component (e), 1 to 4 moles of component (f), and 1 to 7 moles of component (g).

Depending on the nature of the components used and on the molar ratios, the propylene oxide reaction products of the present invention are condensation products both of somewhat lower and of somewhat higher molecular weight.

Condensation products of low molecular weight are obtained primarily when the individual components are used in equivalent amounts (hydroxyl group equivalents), so that as far as possible no polycondensation and crosslinkings take place between polyalcohol, dicarboxylic acid and diol. Typical examples of such condensation products of low molecular weight are reaction products obtained from:

1.

1 mole of component (a),
per valency of component (a), 1 to 4 moles of component (b),
4 moles of component (c),
4 moles of component (e),
4 moles of component (g),
for example:
    1 mole of pentaerythritol,
    4 to 16 of propylene oxide,
    4 moles of maleic anhydride,
    4 moles of fatty alcohol, such as stearyl alcohol, optionally 4 moles of diamine, such as 3-dimethylamino-1-propylamine.

2.

1 mole of component (a),
per valency of component (a), 1 to 4 moles of component (b),
4 moles of component (c),
4 moles of component (d),
4 moles of component (e),
optionally 1 mole of component (g),
for example:
    1 mole of pentaerythritol,
    4 to 16 moles of propylene oxide,
    4 moles of maleic anhydride,
    4 moles of polyethylene glycol or ethylene glycol,
    4 moles of fatty acid, such as stearic acid, optionally 4 moles of diamine, such as 3-dimethylamino-1-propylamine.

3.

1 mole of component (a),
per valency of component (a), 1 to 18 moles of component (b),
3 moles of component (c),
3 moles of component (d),
for example:
    1 mole of glycerol,
    3 to 54 moles of propylene oxide,
    3 moles of maleic anhydride,
    3 moles of polyethylene glycol or ethylene glycol.

Condensation products of higher molecular weight are obtained primarily when the intermediates contain excess, still reactive hydroxyl groups, so that these can condense further and partially crosslink. Typical examples of such condensation products of higher molecular weight are:

4.

1 to 2 moles of an adduct of 1 mole of component (a) and, per valency of component (a),
1 to 4 moles of component (b),
2 to 6 moles of component (c),
1 to 3 moles of component (d),
optionally 3 to 6 moles of component (g),
for example:
    1 mole of sorbitol,
    9 to 10 moles of propylene oxide,
    3 to 6 moles of maleic anhydride,
    1 to 3 moles polyethylene glycol (molecular weight: 400, 600 or 1500);
    2 moles of glycerol,
    4 to 6 moles of propylene oxide,
    6 moles of maleic anhydride,
    2 to 4 moles of polyethylene glycol,
    optionally 3 to 6 moles of 3-dimethylamino-1-propylamine;
    1 mole of pentaerythritol,
    4 to 12 moles of propylene oxide,
    2 moles of maleic anhydride,
    1 mole of polyethylene glycol.

5.

1 to 2 moles of component (a),
per valency of component (a) 1 to 4 moles of component (b),
3 to 7 moles of component (c),
1 mole of component (d),
0 to 4 moles of component (e),
optionally 5 to 7 moles of component (g),
for example:
    1 mole of glycerol,
    3 to 10 moles of propylene oxide,
    3 moles of maleic anhydride,
    2 moles of polyethylene glycol,
    1 mole of stearyl alcohol;

1 to 2 moles of pentaerythritol,
4 to 24 moles of propylene oxide,
3 to 7 moles of maleic anhydride,
1 mole of polyethylene glycol,
1 to 4 moles of stearyl alcohol,
optionally 3 to 7 moles of ethylenediamine.

6.

1 to 2 moles of component (a),
per valency of component (a),
1 to 4 moles of component (b),
1 mole of component (c),
1 to 4 moles of component (f),
e.g. 1 mole of pentaerythtritol,
  8 moles of propylene oxide,
  1 mole of phthalic anhydride,
  1 mole of palmitic acid;

1 mole of pentaerythritol,
  8 moles of propylene oxide,
  1 mole of phthalic anhydride,
  2 moles of palmitic acid.

All these products listed under 1 to 6 can also be in the form of acids, salts or in quaternised form.

Preferred propylene oxide reaction products are those obtained from
a. glycerol or pentaerythritol,
b. propylene oxide,
c. maleic anhydride,
d. polyethylene glycol with an average molecular weight of 200 to 1500,
and optionally
e. stearyl alcohol,
f. stearic acid and/or
g. 3-dimethylamino-1-propylamine,
or those obtained from
a. glycerol or pentaerythritol,
b. propylene oxide,
c. phthalic anhydride and
f. palmitic or stearic acid.

It will be readily understood that these products can also be in the form of acids, salts or quaternary ammonium bases.

The manufacture of the propylene oxide reaction products is accomplished by known methods and is characterised in that an addition product of components (a) and (b) is reacted with component (c) and at least one of components (d), (e) and (f), in the presence of an acid catalyst and optionally of an inert organic solvent, at temperatures of 60° to 120° C, preferably 80° C to 100° C, and subsequently, provided the reaction product contains ethylenically unsaturated bonds and is completely esterified, reacted with component (g), and the product is optionally converted into a salt or quaternised.

When using dicarboxylic acids as component (c), the various components are preferably reacted simultaneously with the adduct of components (a) and (b). This esterification can advantageously be carried out without a solvent or in a solvent which is inert to the reaction components, for example benzene or toluene, and the water of condensation can be removed by azeotropic distillation. This esterification is catalysed by using catalytic amounts of strong acids, for example sulphuric acid or p-toluenesulphonic acid.

If anhydrides are used as component (c), the esterification is advantageously carried out stepwise. For example, the polyol-propylene oxide adduct can first be reacted with the anhydride by heating to 80° to 100° C for 2 to 4 hours in substance to give the corresponding monoesters of the dicarboxylic acid, and these are then further esterified in a second step, while adding an acid catalyst and optionally an inert organic solvent, with a diol [component (d)] and/or a fatty alcohol [component (e)] or with an ester of components (d) and (f), for example a polyethylene glycol monofatty acid ester.

Conversely, when using component (d) or components (d) and (e), the diol, or the diol and the fatty alcohol, can first be reacted with the equivalent amount of acid anhydride by heating to 80° to 100° C for 2 to 4 hours in substance to give the monoesters of the dicarboxylic acid, and these are then further esterified in a second step with the polyol-propylene oxide adduct and optionally with further equivalents of dicarboxylic anhydride while catalysing with an acid, optionally in an organic solvent. The fatty acid can also be added in a second step in such a reaction procedure.

Propylene oxide reaction products containing still free acid groups are obtained by esterifying the reaction product only incompletely, or by reacting still free hydroxyl groups of alcohols at 80° to 100° with dicarboxylic anhydride in a third reaction step.

Amines [component (g)] can only be combined additively with reaction products which contain ethylenically unsaturated bonds that are introduced into the reaction products through component (c). In order that this addition can proceed in the manner desired, the reaction products must be esterified as completely as possible, so that no unwanted secondary reactions occur. In this case it is desirable to add a polymerisation inhibitor, for example di-(tert. butyl)-p-cresol, in amounts of 0.05 to 0.2%, referred to the total weight of the components used. The addition of the amine is usually effected in substance at temperatures of 30° to 75° in the course of 2 to 4 hours. The amine can be used in any desire amount; but at most amounts are added which are equivalent to the ethylenically unsaturated bond. Preferred products are those which contain 0.4 to 1 mole of amine for each original double bond.

The propylene oxide reaction products of the present invention are soluble or emulsifiable in water depending on their composition, i.e. depending on the ratio of hydrophilic to lipophilic groups. It is possible as a rule to obtain 20 to 40 percent by weight of aqueous solutions or, in particular, of emulsions. Products containing acid groups can be stabilised by the addition of bases, for example ammonia or alkali hydroxides, and amine adducts by addition of acids, for example acetic acid or hydrochloric acid, i.e. by salt formation.

The amine adducts which contain tertiary amino groups can be quanternised with conventional quaternising agents, as previously described herein.

The emulsions of the products of the present invention can also contain customary additives, for example emulsifiers and wetting agents.

Depending on their composition, the products of the present invention themselves are solid to liquid, highly viscous products. They can also be in the form of waxes, pastes or also oils and are generally colourless or at most yellowish to brownish in colour.

They can be defined by their Gardner viscosities, measured as 50% solutions in ethanol at 25° C. The viscosities are in the range from $A_1$ to $A_4$ or A to I. The infrared spectrum of the treaction products shows characteristic bands at 2920, 2840, 1160, 1100 and 1090 cm$^{-1}$.

The products of this invention are suitable for the most widely varying uses in textile finishing. In particular they are used as printing and dyeing assistants for different applications.

These printing pastes, dyeing preparations or other application liquors contain as a rule 0.025 to 0.5 preferably 0.1 to 0.4 percent by weight, of the products of the invention, referred to these pastes, preparations or liquors.

For example, they are able to prevent the subsequent bleeding of the white area during the washing-off process of prints on polyester/cotton blends obtained with disperse or reactive dyes.

In the printing of textile webs, in particular those of fibre blends, the dye is not completely fixed during the subsequent fixation. The nonfixed dye has to be washed off in a subsequent process. If this is done without the addition of a suitable assistant, there is the danger that non-printed areas, or areas which ar printed in brighter shades, become stained by the released dye (dyestuff redeposition).

The propylene oxide reaction products of the present invention are able to prevent the dye from exhausting once more onto fabric from which it has been washed off.

The products of this invention are also able to improve the fastness properties of dark dyeings. They can therefore be used as washing-off agents for prints and for dyeings which are not fast to rubbing.

The products of the present invention can also prevent the formation of running folds when dyeing piece goods made from synthetic fibres, for example polyamide or polyester fibres, or from blends of such fibres with natural fibres, such as cotton or wool.

When dyeing these woven and knitted fabrics in dyeing machines in which the goods are agitated (e.g. winch becks, JET dyeing machines), the formation of folds can result. The folds arise through the textile webs sticking to each other as a consequence of high adhesion and are than fixed on account of the thermoplasticity of the fibres.

By adding the propylene oxide reaction products to the dyebath it is possible to offset this adhesion, whereby the surface of the textile webs becomes slippier and slides more easily, so that the folds constantly move and thus cannot be fixed.

A further advantage of the products of the present invention is that they are substantially able to prevent the deposition of oligomers on the textile material during the high temperature dyeing of polyester fibres.

When dyeing polyester fibres, especially at dyeing temperatures above 120°, during a preliminary cleansing with chlorinated hydrocarbons and on adding carriers to the dyebath, oligomers precipitate from the fibrous material and deposit on the material as a whitish coating (filter effect). Where the textile material is in the form of wovens or wound packages, this can result in part of the material becoming unusable. Oligomer deposits on loose material and tops or spinning cable can result in disruptions in the further processing (abrasion, clogging of the spinning machines, dust formation).

To date there is no agent known that reliably prevents such deposits. By using the products of the present invention it is now possible to prevent this oligomer deposit both on the fibrous material and in the dyeing machines. The products of this invention do not have any detrimental effect on the soiling behaviour of the material.

The products are also able to impart antielectrostatic properties to synthetic fibrous material, in particular to textiles.

The parts and percentages in the following Examples are by weight.

EXAMPLE 1 a. 40 parts of a condensation product of 1 mole of pentaerythritol and 4 to 5 moles of propylene oxide, 39.2 parts of maleic anhydride and 0.2 part of di-(tert. butyl)-p-cresol are heated, with stirring, for 2 hours to 90° C. To the mixture are subsequently added 108 parts of stearyl alcohol, 200 parts of toluene and 0.8 part of 96% sulphuric acid. The solution is heated to the boil and approximately 7 parts of water are distilled off as an azeotrope in the course of 2½ hours. The solution is cooled to room temperature, and 5 parts of anhydrous sodium carbonate are added thereto. After stirring for 30 minutes, the salt is filtered off with suction and the solvent is distilled off in vacuo. In this Example, and in each of the following Examples, the Gardner viscosity (T) is determined of 50% solutions of the reaction products in ethanol at 25° C : T = B.

b. The residue — 180 parts — is mixed with 40.8 parts of 3-dimethylamino-1-propylamine and the temperature rises to 40°-50° C. The mixture is kept for 2 hours at 50° C and for 2½ hours at 75° C, in the course of which the corresponding amine forms as a colourless wax. After cooling to 50° C, a 20% emulsion is prepared by adding 850 parts of water and 4 parts of formic acid. This emulsion is adjusted to pH 5 with additional formic acid.

EXAMPLE 2

In Example 1, the condensation product of 1 mole of pentaerythritol and 4 to 5 moles of propylene oxide is replaced by 60 parts of a condensation product of 1 mole of pentaerythritol and 8 moles of propylene oxide, to yield 200 parts of ester homologue, which is reacted with 40.8 parts of 3-dimethylamino-1-propylamine. A colourless wax forms as amine adduct.

Gardner viscosity : T = A 4

EXAMPLE 3

20 parts of a condensation product of 1 mole of pentaerythritol and 4 and 5 moles of propylene oxide, 19.6 parts of maleic anhydride, 0.2 part of di-(tert. butyl)-p-cresol are heated, with stirring, for 2 hours to 90° C. Then 170 parts of polyethylene glycol (600) monostearate, 200 parts of toluene and 1 part of 96% sulphuric acid are added. The mixture is heated to the boil and approximately 3.6 parts of water are distilled off as an azeotrope in the course of 3 hours. After the solution has been cooled to room temperature it is treated with 6 parts of anhydrous sodium carbonate and stirred for 30 minutes. The salt is filtered off with suction and the solvent is distilled off in vacuo. A 20% emulsion is obtained by taking up 50 parts of the condensation product, which is in the form of a usable paste, in 200 parts of water.

Gardner viscosity : T = A 2

EXAMPLE 4

130 parts of polyethylene glycol (400) monostearate are substituted for the polyethylene glycol (600) monostearate used in Example 1, to yield the corresponding condensation product, 34 parts of which are mixed with 4 parts of 3-dimethylamino-1-propylamine. The mixture is kept for 2 hours at 50° C and 2½ hours at 75° C, in the course of which the adduct forms a brownish paste. After cooling to 50° C, a 20% emulsion is prepared by adding 150 parts of water, acetic acid to pH 4.5, and 1 part of a condensation product of 1 mole of stearyl alcohol and 35 moles of ethylene oxide.
Gardner viscosity : T = A 3

EXAMPLE 5

124 parts of a condensation product of 1 mole of glycerol and 52 moles of propylene oxide, 11.6 parts of maleic anhydride and 0.2 part of di-(tert. butyl)-p-cresol are kept for 2 hours at 90° C with stirring. Then 80 parts of polyethylene glycol (average molecular weight 600), 240 parts of toluene and 0.8 part of 96% sulphuric acid are added. The solution is heated to the boil and approximately 2.5 parts of water are distilled off as an azeotrope in the course of 3 hours. The solution is cooled to room temperature, treated with 5 parts of anhydrous sodium carbonate and stirred for 30 minutes. The salt is filtered off with suction and the solvent is distilled off in vacuo. A 30% emulsion is obtained by taking up 80 parts of the ester, which is in the form of a yellowish paste, in 165 parts of water and adding 2 parts of sodium laurylsulphonate.
Gardner viscosity : T = A 3

EXAMPLE 6

70 parts of the condensation product of 1 mol of sorbitol and 9 to 10 moles of propylene oxide and 29.4 parts of maleic anhydride are kept for 2 hours at 90° C with stirring. Then 90 parts of polyethylene glycol (average molecular weight 600), 170 parts of toluene and 0.8 parts of 96% sulphuric acid are added. The solution is heated to the boil and approximately 5.5 parts of water are distilled off as an azeotrope in the course of 4½ hours. The solution is cooled to room temperature, then treated with 5 parts of anhydrous sodium carbonate and stirred for 30 minutes. The salt is filtered off with suction and the solvent is distilled off in vacuo. A 40% emulsion is obtained by taking up 80 parts of the polycondensate, which is in the form of a yellowish oil, in 120 parts of water.
Gardner viscosity : T = A 2

EXAMPLE 7

150 parts of polyethylene glycol with an average molecular weight of 1500 are substituted for the polyethylene glycol with an average molecular weight of 600 used in Example 1, to yield a reaction product in the form of a colourless paste.
Gardner viscosity = A 2

EXAMPLE 8

In Example 6, 58.8 parts of maleic anhydride are used instead of 29.4 parts and the 90 parts of polyethylene glycol with an average molecular weight of 600 are replaced by 120 parts of polyethylene glycol with an average molecular weight of 400. A brownish oil is obtained as reaction product.
Gardner viscosity : T = C

EXAMPLE 9

80 parts of a condensation product of 1 mole of pentaerythritol and 4 to 5 moles of propylene oxide, 39.2 parts of maleic anhydride and 0.2 part of di-(tert. butyl)-p-cresol are kept for 2 hours at 90° C with stirring. Then 20 parts of polyethylene glycol with an average molecular weight of 200, 27 parts of stearyl alcohol, 150 parts of toluene and 0.5 part of 96% sulphuric acid are added. The mixture is heated to the boil and approximately 7 parts of water are distilled off as an azeotrope in the course of 4 hours. The solution is cooled to room temperature, treated with 5 parts of sodium carbonate and stirred for 30 minutes. The salt is filtered off with suction and the solvent is distilled off in vacuo. The residue is heated with 9 parts of maleic anhydride for 3 hours to 90° C. An emulsion is obtained in water, from which a solution forms after neutralisation with a base.
Gardner viscosity : T = A

EXAMPLE 10

In Example 9 the last reaction is carried out with 18 parts of maleic anhydride instead of 9 parts, to yield a yellowish paste as reaction product.
Gardner viscosity : T = E

EXAMPLE 11

The procedure as described in Example 5 is carried out, except that only 40 parts of polyethylene glycol with an average molecular weight of 600 are used. A colourless oil is obtained as reaction product.
Gardner viscosity : T = A 3

EXAMPLE 12

The procedure as described in Example 5 is carried out, except that only 120 parts of polyethylene glycol with an average molecular weight of 1500 are used. A colourless wax is obtained as reaction product.
Gardner viscosity : T = A 3

EXAMPLE 13

The procedure as described in Example 5 is carried out using 120 parts of a condensation product of 1 mole of glycerol and 5 moles of propylene oxide, 88.2 parts of maleic anhydride, 135 parts of polyethylene glycol with an average molecular weight of 300, and 350 parts of toluene. A yellowish oil is obtained as reaction product. Then 56 parts of the condensation product are heated with 3.5 parts of ethylenediamine for 1¼ hours to 50° C. The adduct, which is in the form of a yellowish oil, is taken up in 135 parts of water and the pH is adjusted to 4 with formic acid, whereupon a colloidal solution forms.
Gardner viscosity : T = A 2

EXAMPLE 14

The procedure as described in Example 5 is carried out using 120 parts of a condensation product of 1 mole of pentaerythritol and 8 moles of propylene oxide, 39.2 parts of maleic anhydride, 40 parts of polyethylene glycol with an average molecular weight of 200, and 200 parts of toluene. A yellowish oil is obtained as reaction product.
Gardner viscosity : T = A 2

EXAMPLE 15

80 parts of a condensation product of 1 mole of glycerol and 5 moles of propylene oxide, 58.8 parts of maleic anhydride and 0.2 parts of di-(tert. butyl)-p-cresol are kept for 2 hours at 90° C. Then 27 parts of stearyl alcohol, 40 parts of polyethylene glycol with an average molecular weight of 200, 200 parts of toluene and 1 part of 96% sulphuric acid are added. The solution is heated to the boil and approximately 7.5 parts of water are distilled off as an azeotrope in the course of 3 hours. The solution is cooled to room temperature, treated with 6 parts of anhydrous sodium carbonate and stirred for 30 minutes. The salt is filtered off with suction and the solvent distilled off in vacuo. A 20% emulsion is obtained by taking up 100 parts of the residual reaction product, which is in the form of a yellowish oil, in 400 parts of water.

Gardner viscosity : T = A 1

EXAMPLES 16–18

The components listed in the following table are reacted according to the procedure of Example 15:

Table 1

| Ex. | Condensate type/parts | MA parts | STA parts | PEGL parts/mol. wt. | Appearance of reaction product | Gardner viscosity |
|---|---|---|---|---|---|---|
| 16 | PP01/80 | 68,6 | 108 | 20/200 | colourless paste | C |
| 17 | PP01/80 | 39,2 | 27 | 20/200 | yellowish oil | A 1 |
| 18 | PP01/80 | 39,2 | 27 | 30/300 | yellowish paste | I |
| 19 | PP01/80 | 39,2 | 27 | 60/600 | colourless paste | A 1 |
| 20 | PPO1/80 | 68,6 | 81 | 60/600 | colourless paste | B |
| 21 | PP01/80 | 68,6 | 108 | 60/600 | colourless paste | D |
| 22 | PP01/80 | 49 | 54 | 60/600 | colourless wax | D |
| 23 | PP01/80 | 39,2 | 27 | 150/1500 | yellowish wax | A 1 |
| 24 | PP01/80 | 49 | 54 | 150/1500 | colourless wax | A 1 |
| 25 | PP01/80 | 68,6 | 108 | 150/1500 | colourless wax | A 2 |
| 26 | PP02/120 | 58,8 | 54 | 40/200 | colourless paste | B |
| 27 | PP02/120 | 39,2 | 27 | 60/600 | colourless oil | A 1 |
| 28 | PP02/120 | 49 | 54 | 60/600 | colourless paste | A 2 |

MA = maleic anhydride
STA = stearyl alcohol
PEGL = polyethylene glycol
PP01 = 1 mole of pentaerythritol + 4 to 5 moles of propylene oxide
PP02 = 1 mole of pentaerythritol + 8 moles of propylene oxide

EXAMPLES 29–33

Amine adducts or emulsions thereof are prepared from the following polycondensation products by the process described in Example 16:

Table 2

| Example | Polycondensation product from Example | parts | Dimethylamino-propylamine parts | Appearance of the reaction product |
|---|---|---|---|---|
| 29 | 16 | 79,2 | 8 | colourless paste |
| 30 | 17 | 64 | 6 | yellowish oil |
| 31 | 18 | 67,6 | 6 | yellowish paste |
| 32 | 24 | 65,6 | 6 | yellowish wax |
| 33 | 25 | 79,6 | 8 | yellowish wax |

EXAMPLE 34

100 parts of polyethylene glycol with an average molecular weight of 1000, 81 parts of stearyl alcohol, 49 parts of maleic anhydride and 0.2 parts of di-(tert. butyl)-p-cresol are kept for 1½ hours at 90° C. Then 80 parts of a condensation product of 1 mole of pentaerythritol and 4 to 5 moles of propylene oxide and 9.8 parts of maleic anhydride are added. The mixture is kept for a further 1½ hours at 90° C and then 300 parts of toluene and 1 part of 96% sulphuric acid are added. The solution is heated to the boil and approximately 12.5 parts of water are distilled off as an azeotrope in the course of 5 hours. The solution is cooled to room temperature, and treated with 7 parts of anhydrous sodium carbonate and stirred for 30 minutes. The salt is filtered off with suction and the solvent is distilled off in vacuo. A 20% emulsion is obtained by taking up 100 parts of the condensation product, which is in the form of a brownish wax, in 200 parts of water.

Gardner viscosity : T = E

EXAMPLES 35–42

The components listed in the following table are reacted in accordance with the procedure described in Example 34:

Table 3

| Ex. | PEGL parts/mol. wt. | MA parts | STA parts | Condensate type/parts | Appearance of the reaction product | Gardner viscosity |
|---|---|---|---|---|---|---|
| 35 | 100/1000 | 49 | 54 | PP01/80 | brownish paste | A 1 |
| 36 | 150/1500 | 29,4 | 27 | PP01/40 | brownish wax | A 2 |
| 37 | 150/1500 | 68,6 | 108 | PP01/80 | colourless wax | A |
| 38 | 150/1500 | 58,8 | 81 | PP01/80 | brownish wax | A 2 |
| 39 | 60/600 | 19,6 |  | PP02/120 | yellowish oil | A 4 |
| 40 | 150/1500 | 19,6 |  | PP02/60 | brownish wax | A 1 |
| 41 | 150/1500 | 68,6 | 108 | PP02/120 | brownish wax | B |
| 42 | 150/1500 | 39,2 | 54 | PP02/60 | brownish wax | A 4 |

PEGL = polyethylene glycol
MA = maleic anhydride
STA = stearyl alcohol
PP01 = 1 mole of pentaerythritol + 4 to 5 moles of propylene oxide
PP02 = 1 mole of pentaerythritol + 8 moles of propylene oxide

EXAMPLE 43 a. With stirring, 24.8 parts of ethylene glycol, 78.4 parts of maleic anhydride and 0.2 part of di-(tert. butyl)-β-cresol are heated for 2 hours to 90° C. Then 240 parts of a condensation product obtained from 1 mole of pentaerythritol and 8 moles of propylene oxide and 1 part of 96% sulphuric acid are added and the mixture is kept for 4 hours at 100° C in a water jet vacuum, in the course of which time 13 parts of water are distilled off. The reaction product is cooled to room temperature and then treated with 1.6 parts of 50% aqueous sodium hydroxide solution. A viscous, colourless oil is obtained.

Gardner viscosity : T = A 1 b. 41.1 parts of this reaction product are mixed with 10 parts of 3-dimethylamino-1-propylamine and the mixture is reacted for 2 hours at 50° C and then for 2½ hours at 75° C. The amine adduct which forms is a yellowish viscous oil, which is taken up in 200 parts of water. After adjusting the pH to 6, a 20% clear, yellowish solution is obtained.

EXAMPLE 44 a. With stirring, 120 parts of a condensation product of 1 mole of pentaerythritol and 8 moles of propylene oxide, 29.6 parts of phthalic anhydride and 0.75 part of tri-(n-butyl)amine are heated for 3 hours to 100° C. Then 51 parts of palmitic acid and 1 part of 96% sulphuric acid are added and the mixture is kept for 4 hours at 110° C in a water-jet vacuum, in the course of which time app. 3 parts of water are distilled off. The reaction product is cooled to room temperature and then treated with 1.6 parts of 50% aqueous sodium hydroxide solution. A viscous, colourless oil is obtained.

Gardner viscosity : T = A 1 b. The procedure as described in a) is repeated using 102 parts of palmitic acid. A viscous, colourless oil is also obtained.

Gardner viscosity : T = A 1 c. To make the water-insoluble oils obtained in a) and b) readily emulsifiable in water, they can be processed, for example, to the following preparations:

60 parts of the oil obtained in (a) or (b)
20 parts of ethylene glycol monoethyl ether
20 parts of the ammonium salt of the acid sulphuric acid ester of the adduct of 2 moles of ethylene oxide and 1 mole of p-tert. nonylphenyol (40% aqueous preparation).

Table 4

Infrared spectra of the amine-free condensation products

| Wavelength in $cm^{-1}$ | 1a 2 | 3 4 | 5 | 6 8 | 7 | 9 10 | 11 | 12 | 13 | 14 | 15 | 16 | 17 | 18 | 19 | 20 |
|---|---|---|---|---|---|---|---|---|---|---|---|---|---|---|---|---|
| 2970 | m | | m | | | | | | m | | | | | | | |
| 2960 | | | | s | | | | | | m | | | | | | |
| 2920 | s | | | | | | s | | | | m | s | s | s | s | s |
| 2890 | | s | | s | | | | | | | | | | | | |
| 2870 | s | | s | s | s | | | | s | s | m | | | | | s |
| 2840 | | s | | | | m | m | s | | | | s | s | | | |
| 2400 | w | w | w | w | w | w | w | w | w | w | w | w | w | w | w | w |
| 1740 | | | | | | s | | | | s | | s | | | | |
| 1720 | s | s | m | s | s | | | m | m | | s | | | s | | s |
| 1710 | | | | | | | w | | | | | | s | | s | |
| 1630 | w | w | w | w | w | w | w | w | w | w | w | w | w | w | w | w |
| 1450 | m | w | m | m | m | w | | m | m | m | m | m | w | m | m | m |
| 1440 | | | | | | | | | | | | | | | | |
| 1400 | | | | | | | | | | | | | | m | | m |
| 1390 | m | | | m | | m | | | | m | m | m | m | | m | |
| 1375 | w | w | m | w | w | w | | m | m | m | m | m | | w | | w |
| 1360 | | | | | | | m | | | | | | m | | w | |
| 1345 | w | | w | w | w | | | m | w | w | w | w | | w | w | w |
| 1330 | | w | | | | | | w | | | | | | | | |
| 1290 | | | w | | m | | | w | w | | | | | | | |
| 1280 | | | | | | | | | | | | | | | | |
| 1180 | | | m | m | m | | | | m | | | | | | | |
| 1160 | | | | s | s | s | | | | s | s | s | s | s | s | s |
| 1100 | s | | s | s | | s | | | s | s | s | s | | s | | s |
| 1090 | | s | | | s | | s | s | | | | | s | | s | |
| 1045 | | | m | m | | m | | m | m | | | m | | m | | m |
| 1035 | m | | | | m | | m | | | m | m | | m | | m | |
| 990 | | | | | | w | | w | | w | w | w | w | w | w | w |
| 980 | w | w | | w | w | | w | | | | | | | | | |
| 940 | | | | w | w | | | | | | | | | | | |
| 920 | w | | w | w | w | w | | w | w | w | w | w | | w | w | |
| 910 | | w | | | | | w | | | | | | w | | | w |
| 840 | w | w | | | | | | | w | | | w | | | | w |
| 655 | m | | m | m | m | m | | m | m | | m | m | | m | | m |
| 650 | | m | | | | | m | | | m | | | m | | m | |

| Wavelength in $cm^{-1}$ | 21 | 22 | 23 | 24 25 | 26 | 27 | 28 | 34 | 35 | 36 37 | 38 | 39 | 40 | 41 42 | 43a | 44a | 44b |
|---|---|---|---|---|---|---|---|---|---|---|---|---|---|---|---|---|---|
| 2970 | | | | | | | | | | | | | | m | | | |
| 2960 | | | | | | | | | | | | m | | | | | |
| 2920 | s | | | s | s | s | s | s | s | | s | | | s | | s | |
| 2890 | | s | | | | | | | | s | | | | | s | | s |
| 2870 | | | s | | | | | | | | | s | s | s | | | |
| 2840 | s | s | | | s | s | s | s | s | | s | | | | | s | s |
| 2400 | w | | w | w | w | w | w | w | w | w | w | w | w | w | w | w | w |
| 1740 | | | | | | | | | | | | | | | | | |
| 1720 | | | | | | | s | | | s | s | s | s | | s | | |
| 1710 | s | s | s | s | s | | s | s | | | | | | s | | s | s |
| 1630 | w | w | w | w | w | w | w | w | w | w | w | w | w | w | m | w | w |
| 1450 | m | | w | m | m | w | m | m | m | | m | m | m | m | m | m | m |
| 1440 | | m | | | | | | | | | | | | | | | |
| 1400 | | | | | | | | | | | | | | m | | | |
| 1390 | m | m | w | w | m | m | m | m | m | w | m | m | w | m | | | |
| 1375 | w | | w | w | | m | m | | w | w | m | m | | w | m | m | |
| 1360 | | w | | | w | | | w | | | | | w | | | | m |
| 1345 | w | | w | w | | w | w | w | w | w | w | w | w | | | | |
| 1330 | | w | | w | | | | | | | | | w | | | | |
| 1290 | | | | | | | | | | | | | | | | | |
| 1280 | | m | | | | | | | | | | | | | | m | m |
| 1180 | | | | | | | | | | | m | m | | | m | | |
| 1160 | s | s | | s | s | s | s | s | | | | | | | s | | |

Table 4-continued

| | | | | | | | | | | | | | | | | | | |
|---|---|---|---|---|---|---|---|---|---|---|---|---|---|---|---|---|---|---|
| 1100 | | | | | | s | | | | s | | | | s | s | | s | s |
| 1090 | s | s | s | s | s | | s | s | s | | s | s | s | | | s | | |
| 1045 | | | | | | | | | | | m | m | | | m | m | | |
| 1035 | m | m | m | m | m | m | m | m | m | m | | | m | m | | | | m |
| 990 | w | w | w | w | w | w | w | w | w | w | w | w | w | w | w | w | | |
| 980 | | | | | | | | | | | | | | | | | | w |
| 940 | | | w | | | | w | w | | | | w | | | | | | |
| 920 | | | | w | | w | | | | w | w | w | w | w | w | | | |
| 910 | w | w | w | | w | | w | w | w | w | | | | | | | | w |
| 840 | w | | w | w | | | | w | | w | | | w | w | | | | |
| 655 | m | | | | | m | m | | m | m | m | m | | m | m | | | |
| 650 | | m | m | m | m | | m | | | | | | m | | | m | m | m | w = weak absorption
m = average absorption
s = high absorption

EXAMPLE 45

100 g of a knitted fabric made of texturised polyamide 66 fabric are dyed in a laboratory jet dyeing apparatus in the conventional way in 2.4 litres of water with the following ingredients:

1.5 g of a dye of formula

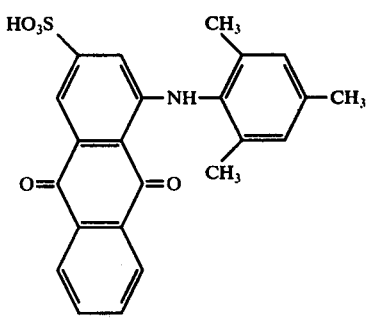

(2)

1 g of a condensation product of 1 mole of fatty amine and 70 moles of ethylene oxide
0.5 g of 80% acetic acid
1 g of ammonium acetate
3 g of one of the preparations listed in the following table.

Dyeing is initially started at 40° C and the additives are diluted with water in the above sequence and added to the dyebath. The temperature of the dyebath is then raised to boiling temperature (96° C). Dyeing is then performed for 40 minutes at this temperature. The bath is subsequently cooled to 20° C within 5 minutes and the fabric is drained and dried. A level, blue dyeing is obtained on the fabric. The Monsanto image according to AATCC 88A - 1964 T (degree of crease formation in textiles) is determined in comparison to dyeings without addition of a propylene oxide reaction product.

Table 5

| Preparation according to Example | Monsanto image |
|---|---|
| without preparation | 1 |
| 1 | 3 |
| 2 | 2-3 |
| 3 | 1-2 |
| 5 | 2 |
| 6 | 3 |
| 7 | 2 |
| 8 | 1-2 |
| 11 | 2 |
| 12 | 2 |
| 13 | 3-4 |
| 23 | 2-3 |
| 29 | 2-3 |
| 36 | 1-2 |
| 39 | 1-2 |
| 40 | 3 |
| 42 | 1-2 |

EXAMPLE 46

100 g of a texturised polyester knitted fabric are dyed in 2.4 litres of water in a laboratory jet dyeing apparatus with the following ingredients:

5 g of ammonium sulphate
2 g of a mixture of an oleic acid polyglycol ester and an adduct of 9 moles of ethylene oxide and 1 mole of p-tert. octylphenol
0.2 g of 85% formic acid
2.5 g of the reaction product of Examples 3, 13, 29, 36 or 40
2 g of a dye of formula

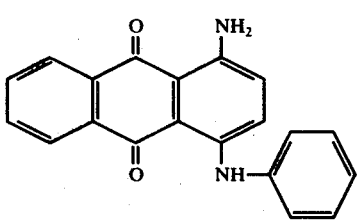

(3)

The above ingredients are dissolved or dispersed in water and added to the 70° C warm dyebath. The dyeing temperature is raised in the course of 60 minutes to 135° C and dyeing is performed for 60 minutes at this temperature. Then the temperature is lowered to 20° C within 4 minutes by simultaneously switching on the cooling and passing in cold water. The fabric is then rinsed, drained and dried. The resultant Monsanto image is shown in Table 6.

Table 6

| Preparation according to Example | Monsanto image |
|---|---|
| without preparation | 1 |
| 3 | 3 |
| 13 | 3 |
| 29 | 2 |
| 36 | 3 |
| 40 | 3 |

EXAMPLE 47

100 kg of a fabric made from 55 parts of polyester and 45 parts of wool (homogeneously blended) are dyed on a winch beck with the following ingredients:
4000 liters of water of 50° C
1000 g of a mixture of the dyes of formulae (4) and (5)
800 g of the sodium salt of ethylenediaminetetraacetic acid
4000 g of the reaction product of naphthalenesulphonic acid/formaldehyde
2000 g of an amphoteric fatty amine polyglycol ether sulphate
8000 g of a benzyl phenol carrier
1000 g of one of the preparations listed in Table 7

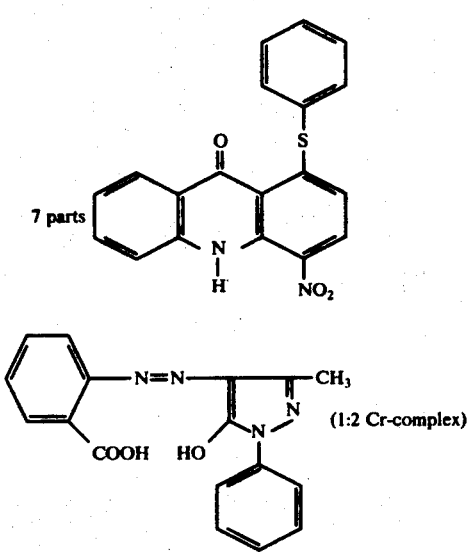

The above ingredients are diluted with water and added to the dyebath. The bath is then heated in the course of 30 minutes to boiling temperature and dyeing is performed for 1 hour at the constant boil. Then the dyebath is cooled to 20° C by passing in cold water and the fabric is rinsed and dried.

A level, fast, yellow dyeing is obtained. The following Monsanto images are obtained in comparison to dyeings obtained without the addition of a propylene oxide reaction product.

Table 7

| Preparation according to Example | Monsanto image |
| --- | --- |
| without preparation | 1 |
| 3 | 1-2 |
| 13 | 2 |
| 29 | 2-3 |
| 42 | 2 |

EXAMPLE 48

100 kg of a fabric made from polyester/cellulose (67:33) are dyed in a high temperature jet dyeing machine with the following ingredients:

3000 liters of water
600 g of a fatty alkylbenzimidazole sulphonate
6000 g of ammonium sulphate
2000 g of a mixture of dyes of formulae (6) and (7)

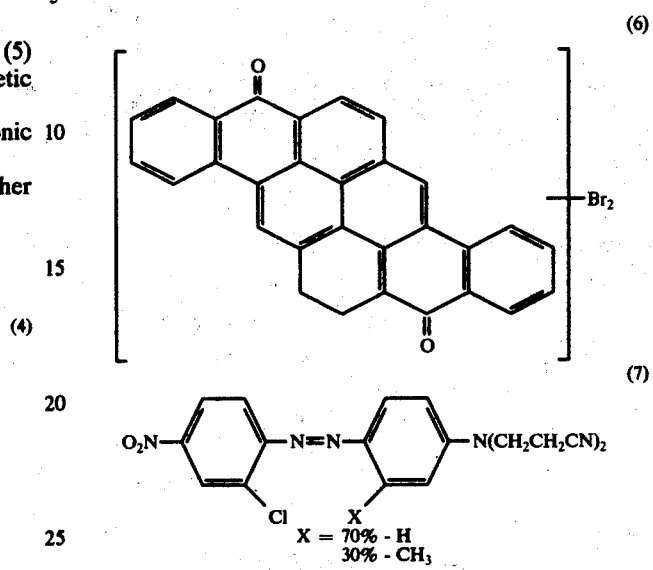

The ingredients are dissolved in water and added to the 60° C warm dyebath. Then 2000 g of one of the preparations listed in Table 8 are added. The pH is adjusted to 5 with formic acid. The goods are allowed to circulate for 15 minutes in these ingredients. The temperature is then raised to 130° C in the course of 50 minutes and treatment is carried out for 90 minutes at this temperature. The liquor is then cooled to 70° C and the following ingredients are added to develop the vat dye:
9000 g of sodium hydroxide solution (30%)
9000 g of sodium bisulphite (40%)
5000 g of sodium chloride Treatment with these ingredients is effected for 45 minutes at 70° C. The goods are subsequently rinsed and oxidised with $H_2O_2$, then rinsed again, drained and dried.

A fast, level orange dyeing is obtained. The following Monsanto images are obtained in comparison to dyeings without the addition of a propylene oxide reaction product.

Table 8

| Preparation according to Example | Monsanto image |
| --- | --- |
| without preparation | 1 |
| 3 | 2 |
| 29 | 2 |
| 36 | 1-2 |
| 40 | 3-4 |
| 42 | 2 |

EXAMPLE 49

A fabric made from polyester/cellulose (67:33) is printed in a stripe pattern with the following preparation:

| 40 g/kg | of a mixture of dyes of formulae (8) and (9) |
| 30 g/kg | of a mixture of dyes of formulae (10) and (11) |
| 5 g/kg | of the dye of formula (12) |
| 925 g | of stock thickening |

-continued 1000 g   of printing paste (8)
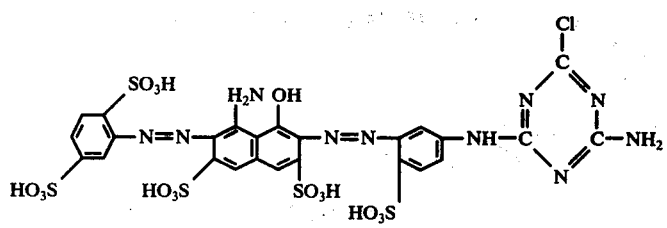

(9)
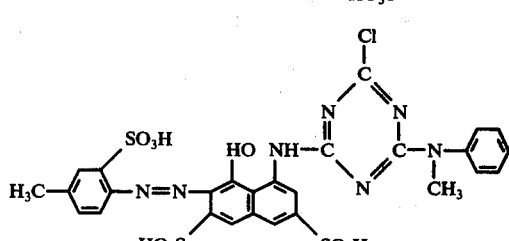

(10)
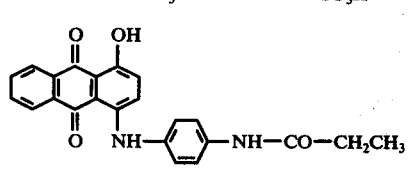

(11)
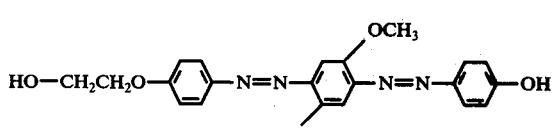

(12)
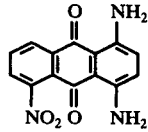

The stock thickening is prepared as follows:
| | | |
|---|---|---|
| 500 g | of alginate thickening (8-12 %) | |
| x g | of water | |
| 10 g | of sodium nitrobenzenesulphonate | |
| 50 g | of urea | |
| 10-20 g | of sodium bicarbonate | |
| 1000 g | of stock thickening | |

After it has been printed the fabric is dried and then fixed for 8 minutes at 170°–180° C in a high temperature festoon steamer.

Since in the nature of things both disperse dye and reactive dye are applied to the cellulose fibres during the printing, i.e. are not fixed, a substantial amount of dye is present in the wash liquor during the washing-off process. The non-printed areas are strongly stained if no suitable preparation is used.

Washing-Off

The printed material is conveyed through the following wash liquors:

| | |
|---|---|
| compartment 1 | intensive spraying without liquor level |
| compartment 2 | rinsing, cold, if appropriate with the addition of 1-2 g/l of sodium hexametaphosphate |
| compartment 3 | soaping with 3 g/l of the product of Example 37 at 60° C |
| compartments 4–7 | soaping with 2 g/l of the product of Example 37 at 90°–95° C |
| compartment 8 | rinsing, cold |

The addition of a propylene oxide reaction product prevents the bleeding of the non-printed areas. Table 9 shows the results of a washing-off without and with a preparation of the present invention.

Table 9

| Preparation according to Example | Washing-Off |
|---|---|
| without preparation | 1 |
| 9 | 3 |
| 10 | 2 |
| 14 | 4 |
| 15 | 3 |
| 19 | 4 |
| 21 | 3 |
| 22 | 3 |
| 27 | 4 |
| 28 | 4 |
| 32 | 3 |
| 33 | 3 |
| 35 | 4 |
| 37 | 4 |
| 38 | 4 |

Table 9-continued

| Preparation according to Example | Washing-Off |
|---|---|
| 41 | 4 |

Rating:
1 = pronounced bleeding
2 = less pronounced bleeding than 1
3 = very slight bleeding
4 = no bleeding

EXAMPLE 50

100 kg of a polyester fabric which has been cleansed beforehand in perchloroethylene at 60° C, is dyed as follows in a beam dyeing apparatus (autoclave):

| | |
|---|---|
| dye liquor: | 1500 litres, 60° C |
| dye: | 2000 g of the dye of formula (3) |
| buffer: | 2000 g of ammonium sulphate |
| acid: | 500 g of formic acid |
| dispersant: | 300 g of a fatty alkylbenzimidazole sulphonate |
| carrier: | 6000 g of a 40 % emulsion of trichlorobenzene |
| oligomer inhibitor: | 6000 g of the preparation of Example 31 (20 %) |

The ingredients are dissolved or dispersed in water and added to the dyebath. The bath is then heated to 135° C in the course of 60 minutes and dyeing is performed for 60 minutes at this temperature. The bath is then run off as quickly as possible and the material is thoroughly rinsed and dried. A fast, level, blue dyeing without oligomer deposits is obtained. If the same dyeing procedure is carried out without the addition of the preparation of Example 31, heavy oligomer deposits are observed, above all in the inside of the roll of material.

Results similar to those obtained with the preparation of Example 31 are also obtained with the preparations of Examples 4, 5, 11, 12, 20, 26, 30 or 32.

EXAMPLE 51

250 g of polyester knitted fabrics which have been cleansed beforehand in perchloroethylene at 60° C is dyed in a high temperature dyeing apparatus in an aqueous liquor which contains 6% of the dye of formula

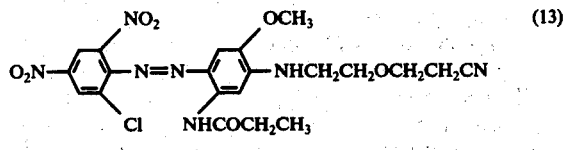

(13)

2 g/l of ammonium sulphate
4 g/l of a 40% emulsion of trichlorobenzene
X g/l of the emulsion of Example 43a (20%)
and, optionally, as additional customary dyeing assistants 1 g/l of the ammonium salt of the acid sulphuric acid ester of the condensation product of 1 mole of glycerol and 54 moles of propylene oxide (50%) (assistant A)

or 1 g of the adduct of 1 mole of oleic acid and 12 moles of ethylene oxide (assistant B).

The liquor ratio is 1:13. The pH of the liquor is adjusted with formic acid to 4.5 to 5. These ingredients are added to the liquor at 60° C. The liquor is then heated to 130° C in the course of 20 minutes and dyeing is carried out for 1 hour at this temperature. The liquor is then cooled to app. 80° C and run off. The fabric is subsequently given a reductive aftertreatment in the usual manner (aqueous liquor which has been made alkaline with sodium hydroxide and which contains sodium hydrogen sulphite) and then rinsed and dried.

Fast, level blue dyeings are obtained. Table 10 gives details of the amounts of the emulsions of Example 43a used in the liquors and of the amounts of assistants A and B, and also contains the results of the examination of the dyed knitted fabrics for oligomer deposits. The oligomer deposit is evaluated visually using a scale from 1 (no deposit) to 6 (very heavy deposits).

Table 10

| bath composition (g/l) | dyeings | | | | |
|---|---|---|---|---|---|
| | 1 | 2 | 3 | 4 | 5 |
| emulsion of example 43a | — | 2 | 4 | 4 | 4 |
| assistant A | — | — | — | 1 | — |
| assistant B | — | — | — | — | 1 |
| oligomer deposit (rating 1 to 6) | 6 | 4–5 | 3 | 2 | 1–2 |

The results of the Table show that the oligomer deposit can be substantially reduced or almost completely prevented by the addition of the emulsion of Example 43a.

EXAMPLE 52

100 kg of polyester yarn in muff form are dyed in a cheese dyeing machine as follows:

1300 liters of water are heated to 60° C in a preparing vessel. To this initial bath are then added 2600 g of ammonium sulphate
200 g of formic acid (85%)
4000 g of a preparation according to Example 44c (60%)
and
5200 g of 40% emulsion of trichlorobenzene.

This starting bath is then pumped into the dyeing apparatus. The liquor flow is periodically reversed, so that it is pumped for about 2 minutes from the inside of the muff to the outside and then for about 3 minutes in the opposite direction. After 15 minutes, 4000 g of the dye of formula (13) (dispersed beforehand in water of 60° C) are added to the dyeing apparatus. The temperature is subsequently raised to 130° C in the course of 30 minutes and dyeing is carried out for 60 minutes at this temperature. After the dyebath has cooled to 90° C is is run off from the apparatus. The yarn is then given an aftertreatment for 20 minutes at 80° to 90° C with a liquor of the following composition:

1300 liters of water of 90° C
6500 g of sodium hydroxide solution (30%)
1300 g of sodium bisulphite.

The fabric is thoroughly rinsed with warm and cold water. A level, fast, blue dyeing is obtained. The examination for oligomer deposits is carried out in such a manner that the yarn is conveyed through the slit of a stiff sheet of paper, Any oligomers which have deposited onto the surface of the yarn are scraped off and collect on the paper. The results of the examination carried out on yarn dyed in the above liquor show that no oligomers have been scraped off, but that there is a marked oligomer deposit when the yarn is dyed in a liquor that does not contain the preparation of Example 44c.

We claim:

1. A propylene oxide reaction product and a salt thereof obtained by reacting an adduct of
   a. an at least trihydric aliphatic alcohol containing 3 to 10 carbon atoms, and
   b. 1,2-propylene oxide, with
   c. an aliphatic dicarboxylic acid containing 2 to 10 carbon atoms, an aromatic dicarboxylic acid containing 8 to 12 carbon atoms, or an anhydride thereof, and a.
   a fatty acid containing 12 to 22 carbon atoms.

2. Propylene oxide reaction product according to claim 1, wherein a trihydric to hexahydric alkanol containing 3 to 6 carbon atoms is used as component (a).

3. Propylene oxide reaction product according to claim 2, wherein glycerol, pentaerythritol, sorbitol or trimethylolpropane is used as component (a).

4. Propylene oxide reaction product according to claim 1, wherein an aliphatic dicarboxylic acid containing 2 to 10 carbon atoms, or the anhydride thereof, is used as component (c).

5. Propylene oxide reaction product according to claim 4, wherein an aliphatic unsaturated dicarboxylic acid containing 4 to 10 carbon atoms, or the anhydride thereof, is used as component (c).

6. Propylene oxide reaction product according to claim 4, wherein an ethylenically unsaturated dicarboxylic acid containing 4 to 10 carbon atoms, or the anhydride thereof, is used as component (c).

7. Propylene oxide reaction product according to claim 6, wherein maleic anhydride is used as component (c).

8. Propylene oxide reaction product according to claim 1, wherein a monocyclic or biocyclic aromatic dicarboxylic acid containing 8 to 12 carbon atoms, or the anhydride thereof, is used as component (c).

9. Propylene oxide reaction product according to claim 8, wherein phthalic anhydride is used as component (c).

10. Propylene oxide reaction product according to claim 1, wherein a saturated fatty acid containing 16 to 20 carbon atoms is used as component (d).

11. Propylene oxide reaction product according to claim 10, wherein stearic acid is used as component (d).

12. Propylene oxide reaction product according to claim 1 which are obtained from 1 to 2 moles of component (a), 4 to 120 moles of component (b), 1 to 7 moles of component (c), and 1 to 4 moles of component (d).

13. Propylene oxide reaction product according to claim 12 which contain 2 to 7 moles of component (c).

14. Propylene oxide reaction product according to claim 1, which are obtained from
   a. glycerol or pentaerythritol,
   b. propylene oxide,
   c. phthalic anhydride and
   d. palmitic or stearic acid.

15. Propylene oxide reaction product according to claim 1, which have Gardner viscosities of $A_1$ to $A_4$ and A to I.

16. A process for the manufacture of a propylene oxide reaction product according to claim 1 comprising the step of reacting an addition product of
   a. an at least trihydric aliphatic alcohol containing 3 to 10 carbon atoms and
   b. 1,2-propylene oxide, with
   c. an aliphatic dicarboxylic acid of 2 to 10 carbon atoms, an aromatic dicarboxylic acid of 8 to 12 carbon atoms or an anhydride thereof, and
   d. a fatty acid containing 12 to 22 carbon atoms, in the presence of an acid catalyst and optionally of an inert organic solvent, at temperature of 60° to 120° C.

17. A process according to claim 16, wherein a trihydric to hexahydric alkanol containing 3 to 6 carbon atoms is used as component (a).

18. A process according to claim 17 wherein glycerol, pentaerythritol, sorbitol or trimethylolpropane is used as component (a).

19. A process according to claim 16, wherein an aliphatic dicarboxylic acid containing 2 to 10 carbon atoms, or the anhydride thereof, is used as component (c).

20. A process according to claim 19, wherein an aliphatic, saturated or ethylenically unsaturated dicarboxylic acid containing 4 to 10 carbon atoms, or the anhydride thereof, is used as component (c).

21. A process according to claim 19, wherein the anhydride of an ethylenically unsaturated dicarboxylic acid containing 4 to 10 carbon atoms is used as component (c).

22. A process according to claim 19, wherein maleic anhydride is used as component (c).

23. A process according to claim 16, wherein a monocyclic or bicyclic aromatic dicarboxylic acid containing 8 to 12 carbon atoms, or the anhydride thereof, is used as component (c).

24. A process according to claim 23, wherein phthalic anhydride is used as component (c).

25. A process according to claim 16, wherein a saturated fatty acid containing 16 to 20 atoms is used as component (d).

26. A process according to claim 25, wherein palmitic or stearic acid is used as component (d).

27. A process according to claim 16, which comprises the use of 1 to 2 moles of component (a), 4 to 120 moles of component (b), 1 to 7 moles of component (c), and 1 to 4 moles of component (d).

28. A process according to claim 27 which comprises the use of 2 to 7 moles of component (c).

29. A process according to claim 17 which comprises the use of
   a. glycerol or pentaerythritol,
   b. propylene oxide,
   c. phthalic anhydride and
   d. palmitic acid.

30. A process for dyeing and printing at least partially synthetic fibrous material, which comprises carrying out the dyeing or printing in the presence of a propylene oxide reaction product according to claim 1.

31. An aqueous dyeing assistant preparation containing at least one propylene oxide reaction product of the composition stated in claim 1.

32. A dyebath containing at least one dye and at least one propylene oxide reaction product of the composition stated in claim 1.

33. A printing paste containing at least one dye and at least one propylene oxide reaction product of the composition stated in claim 1.

* * * * *

UNITED STATES PATENT OFFICE
CERTIFICATE OF CORRECTION

Patent No. 4,055,393          Dated  October 25, 1977

Inventor(s)  PAUL SCHAFER ET AL

It is certified that error appears in the above-identified patent and that said Letters Patent are hereby corrected as shown below:

Claim 1, column 23, line 9, delete "a."; and further in column 23, line 10, add "d." at the beginning of the line.

Signed and Sealed this

*Twenty-fourth* Day of *July 1979*

[SEAL]

*Attest:*

LUTRELLE F. PARKER

*Attesting Officer*     *Acting Commissioner of Patents and Trademarks*